(12) United States Patent
Shiga et al.

(10) Patent No.: US 7,578,449 B2
(45) Date of Patent: Aug. 25, 2009

(54) INDEX CARD FOR RECORDING MEDIUM CASING AND RECORDING MEDIUM CASING

(75) Inventors: Hideaki Shiga, Odawara (JP); Yosuke Sumiya, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 356 days.

(21) Appl. No.: 11/386,818

(22) Filed: Mar. 23, 2006

(65) Prior Publication Data

US 2006/0214007 A1    Sep. 28, 2006

(30) Foreign Application Priority Data

Mar. 24, 2005   (JP) ............... 2005-085175

(51) Int. Cl.
*G06K 19/06* (2006.01)
(52) U.S. Cl. ............ 235/492; 235/441; 235/449; 235/451
(58) Field of Classification Search ........ 235/441, 235/451, 492
See application file for complete search history.

(56) References Cited

U.S. PATENT DOCUMENTS

| | | | | |
|---|---|---|---|---|
| 5,101,971 A | * | 4/1992 | Grobecker | 206/232 |
| 5,528,222 A | * | 6/1996 | Moskowitz et al. | 340/572.7 |
| 6,155,026 A | * | 12/2000 | Tracy | 53/411 |
| 6,967,630 B2 | | 11/2005 | Tada | |
| 7,158,031 B2 | * | 1/2007 | Tuttle | 340/572.1 |
| 2001/0011012 A1 | | 8/2001 | Hino et al. | |
| 2002/0157975 A1 | | 10/2002 | Tsunematsu | |
| 2003/0075608 A1 | * | 4/2003 | Atherton | 235/492 |
| 2005/0171795 A1 | * | 8/2005 | Kearby et al. | 705/1 |

FOREIGN PATENT DOCUMENTS

| | | |
|---|---|---|
| JP | 10214478 A | 8/1998 |
| JP | 3075988 U | 12/2000 |
| JP | 2002326695 A | 11/2002 |
| JP | 2004-103082 A | 4/2004 |
| JP | 3107461 U | 12/2004 |
| JP | 2006076151 A | 3/2006 |
| WO | WO 00/07190 A1 | 2/2000 |
| WO | WO 2004/114241 A2 | 12/2004 |

* cited by examiner

*Primary Examiner*—Michael G Lee
*Assistant Examiner*—Ali Sharifzada
(74) *Attorney, Agent, or Firm*—Sughrue Mion, PLLC

(57) ABSTRACT

An index card for mounting on a casing for accommodating a recording medium includes a contact type or non-contact type IC for storing information or for processing signals.

9 Claims, 4 Drawing Sheets

INDEX CARD FOR RECORDING MEDIUM CASING AND RECORDING MEDIUM CASING

BACKGROUND OF THE INVENTION

1. Field of the Invention

This invention relates to an index card for a recording medium casing for accommodating therein a recording medium and a recording medium casing provided with the index card and more particularly to an index card provided with a non-contact type integrated circuit element called a non-contact type IC or a RF-ID or a contact type integrated circuit element and a recording medium casing provided with such an index card.

2. Description of the Related Art

In a casing for accommodating a recording medium such as an optical disk, a magnetic disk, a magnet-optical disk, magnetic tape, a semiconductor memory or the like, an index card recording thereon information on what is recorded in the recording medium is attached in order to know the information without the recording medium being loaded in a reproduction system, and the index card is arranged to be visible from outside the casing or to be taken out from the casing to read the information recorded on the index card.

However, since the area of the index card is limited though the recording media are very much increased in their recording capacities, there are often cases that what is recorded in the recording medium is too long to record manually or by a printer on the index card.

Further, as the number of the recording medium to be stored increases, to search for a recording medium in which a desired content is recorded in the vast number of recording media requires substantial time and labor even if an index card on which such information has been recorded is provided.

Further, recently, there have been demands that production information (lot number, data on the specification and/or the characteristics of the recording medium, and the like), sales information, career in renting and/or information when the recording medium is used or discarded are recorded in sequence and that further detailed information on what is recorded in the recording medium such as data directory or information attached to information on what is recorded in the recording medium such as information which explains or replenishes the information on what is recorded in the recording medium is to be obtained easily and rapidly without the recording medium being loaded in a reproduction system to utilize them in retrieving, processing and/or managing.

In order to meet these demands, there have been proposed, for instance, a recording medium disk provided with a non-contact type IC and an antenna on the recording medium itself or the cartridge having the recording medium built therein (Japanese Unexamined Patent Publication No. 11(1999)-086347), a cartridge type recording medium disk provided with a non-contact type IC and an antenna on the label bonded to the recording medium cartridge (Japanese Unexamined Patent Publication No. 10(1998)-214478), and a recording medium cassette provided with a non-contact type IC and a terminal connected to the non-contact type IC in the recording medium cartridge and with an antenna and a terminal in the casing for the recording medium cartridge so that the terminals are brought into contact with each other to connect the antenna with the non-contact type IC in response to accommodation of the recording medium in the casing (Japanese Unexamined Patent Publication No. 2004-103082).

In these non-contact type IC, it is needless to say that as the area (loop) of the antenna is enlarged, the region over which the transmission can be received becomes wider (U.S. Pat. No. 6,967,630).

However, when a non-contact type IC and an antenna are provided on the recording medium itself as disclosed in Japanese Unexamined Patent Publication No. 11(1999)-086347, the region in which the antenna is positioned is limited to a narrow range and at the same time, when the non-contact type IC is partly mounted on a recording medium where very accurate characteristics are required in the environmental change during manufacture and/or storage/use with respect to the dimensional accuracy, warp, rotational balance and the like, there is a fear that the characteristics are deteriorated and the manufacturing cost can be added.

Further, when a non-contact type IC and an antenna are provided on the cartridge having a recording medium built therein as disclosed in Japanese Unexamined Patent Publication No. 11(1999)-086347, to mount a non-contact type IC and an antenna on a three-dimensional plastic component and to connect them to function will give rise to a lot of difficulties in technique and cost though it seems that as if there is plenty of space in which a relatively large area antenna is positioned.

Though simpler and can be realized at lower cost as compared with those disclosed in Japanese Unexamined Patent Publication No. 11(1999)-086347, those where a non-contact type IC and an antenna are provided on the label bonded to the recording medium cartridge as disclosed in Japanese Unexamined Patent Publication No. 10(1998)-214478 are limited in the region on which the label is applied since the recording medium cartridge has a mechanical interface which connects the recording medium cartridge to the recording/reproducing system, and it is difficult to ensure the space in which a large area antenna is positioned. Accordingly, since it is necessary to cause an external antenna to approach the cartridge when external information is to be transmitted to or received by the non-contact type IC, it becomes difficult to add a function which requires a long transmission distance and a wide transmission range as in the case where information is received at one time from the non-contact type ICs of a plurality of cartridges which have been stored in a casing in a stacked state.

The recording medium cassette provided with a non-contact type IC and a terminal connected to the non-contact type IC in the recording medium cartridge and with an antenna and a terminal in the casing for the recording medium cartridge so that the terminals are brought into contact with each other to connect the antenna with the non-contact type IC in response to accommodation of the recording medium in the casing as disclosed in Japanese Unexamined Patent Publication No. 2004-103082 is disadvantageous in that a fear that contact failure is generated between the terminals cannot be avoided since it is necessary to provide terminals in both the cartridge and the casing though a non-contact type IC is used though the above problem can be overcome.

Though it is further conceivable to provide a contact-type IC which is provided with a terminal and requires no antenna in a recording medium or a cartridge having such a recording medium built therein, this approach is disadvantageous in that the recording medium or the cartridge can be wholly defective when the IC fails during use or storage after the recording medium or the cartridge is shipped irrespective of whether the IC is of a contact type or a non-contact type. In the case of failure, though changing the IC or copying it to the recording medium is possible, for instance, changing the IC built in the cartridge requires disassembling of cartridge shells which are fastened together by welding or screwing. The recording medium in which information has been recorded can be deteriorated or a lot of labor and/or cost can be required upon disassembling of cartridge shells.

Further, ICs are costly irrespective of whether they are of a contact type or a non-contact type, and when ICs are mounted on a recording medium or a cartridge, the cost of a recording medium or a cartridge is increased. Accordingly, for the users which does not need a lot of information on the recording medium and what is recorded in the recording medium, an inexpensive recording medium or cartridge without an IC is sufficiently conceivable. However, for the manufacturer, to deal it with the assembly line becomes difficult since it means that the kinds of the product to be assembled in the assembly line increases. Further, it becomes impossible after assembly to visually distinguish whether an IC is built in the cartridge.

Further, in the case where though a recording medium or a cartridge without a contact type or non-contact type IC has been purchased at the beginning, an IC subsequently becomes necessary, it is very difficult to post mount an IC and there is an increased fear that important recorded data is damaged.

SUMMARY OF THE INVENTION

In view of the foregoing observations and description, the primary object of the present invention is to mount a non-contact type IC and an antenna so that a long transmission distance and a wide transmission range are ensured.

A second object of the present invention is to mount an IC so that it can be changed without damaging the recording medium or requiring a large labor or a high cost in the case of failure of the IC.

A third object of the present invention is to provide a recording medium which can be easily changed at low cost to a recording medium with a contact type or a non-contact type IC even if it has been designed to be a recording medium without a contact type or a non-contact type IC, and to provide a recording medium which can be changed at low cost to a recording medium without a contact type or a non-contact type IC even if it has been designed to be a recording medium with a contact type or a non-contact type IC.

An index card of the present invention is for mounting on a casing for accommodating a recording medium and is characterized by having a contact type or non-contact type IC for storing information or for processing signals.

In the case of an index card with a non-contact type IC, the index card is provided with an antenna connected to the IC. It is preferred that the antenna be positioned along the outer periphery of the index card.

In the case of an index card with a main label portion and a back label portion, the antenna may be positioned in only the main label portion or only the back label portion though the antenna may be positioned in both the main label portion and the back label portion.

It is preferred that at least one of the IC and the antenna be not exposed in the surface and coated with a coating layer. In this case, it is preferred that the coating layer be of a writable material.

It is preferred that at least one of the IC and the antenna be positioned in a position which is invisible from outside in a state where the index card is placed in a casing and the casing is closed.

It is preferred that the IC be positioned on the outer periphery (preferably in the corner) of the index card.

It is preferred that the writable region in the index card be in a region but a region of the IC.

A casing for a recording medium in accordance with the present invention is characterized by being provided with such an index card.

Further, a casing for a recording medium in accordance with the present invention is characterized in that an index card having a contact type IC which is provided with a terminal and is for storing information or for processing signals is mounted so that the terminal is exposed in a position which is visible from outside in a closed state of the casing.

In this case, it is preferred that the casing be provided with an opening which permits access to the terminal from outside.

In accordance with the present invention, since a contact type or non-contact type IC is provided on the index card, the IC can be changed without damaging the recording medium or requiring a large labor or a high cost in the case of failure of the IC.

Further, a recording medium can be easily changed at low cost to a recording medium with a contact type or a non-contact type IC even if it has been designed to be a recording medium without a contact type or a non-contact type IC. Conversely, a recording medium can be easily changed at low cost to a recording medium without a contact type or a non-contact type IC even if it has been designed to be a recording medium with a contact type or a non-contact type IC.

When a recording medium is provided with a non-contact type IC and an antenna, a long transmission distance and a wide transmission range are ensured with the recording medium being accommodated in the casing together with the index card since it can be provided with a large area loop antenna. Accordingly, information can be easily obtained without moving casings when a plurality of casings each accommodating a recording medium together with an index card have been stored in a stacked state or a recording medium having necessary information can be easily searched and identified out of a plurality of recording media in casings which are arranged on a shelf.

When the index card comprises a main label portion and a back label portion and is provided with a non-contact type IC, and a loop antenna, and the loop antenna is positioned in both the main label portion and the back label portion, the transmission range can be widened since the loop antenna has a sensitivity in a plurality of different directions.

When the loop antenna is positioned in both the main label portion and the back label portion, there is a fear that the loop antenna is broken at bending portion between the main label portion and the back label portion after a long use. On the other hand, when the loop antenna is positioned in only the main label portion or only the back label portion, the fear that the loop antenna is broken at bending portion between the main label portion and the back label portion after a long use can be eliminated and the reliability can be improved. Especially, when the loop antenna is positioned in only the back label portion, interferences of transmissions can be prevented when a number of casings with a recording medium are arranged in the same direction or are stacked in the same direction since external antennas can be caused to approach the back label portions though the loop antenna is made small in size.

When at least one of the IC and the antenna, especially the antenna is not exposed in the surface and coated with a coating layer, the antenna can be prevented from being eroded or broken by being brought into contact with another member. Further, if at least one of the IC and the antenna is positioned in a position invisible from outside, when the index card is viewed through a transparent casing, not only the appearance thereof is improved but also the writable region visible from outside the casing can be widened.

When the IC is positioned on the outer periphery of the index card, especially in the corner thereof, the writable region can be wide irrespective of whether the IC is of a contact type or a non-contact type.

Further, when an index card having a contact type IC provided with a terminal is mounted in the casing so that the terminal is exposed in a position which is visible from outside in a closed state of the casing, what is stored in the IC can be read from outside even if the casing is closed by providing the casing with an opening which permits access to the terminal from outside.

In accordance with the present invention, write and read of information can be extremely facilitated irrespective of whether the IC is of a contact type or a non-contact type since write and read of information in the IC on each index card of a number of recording media in casings can be done without troublesome work of directly handling the recording media to write and read in sequence and at the same time, the index card can be taken out form the casing to write and read information.

DESCRIPTION OF THE PREFERRED EMBODIMENT

Figure 1:
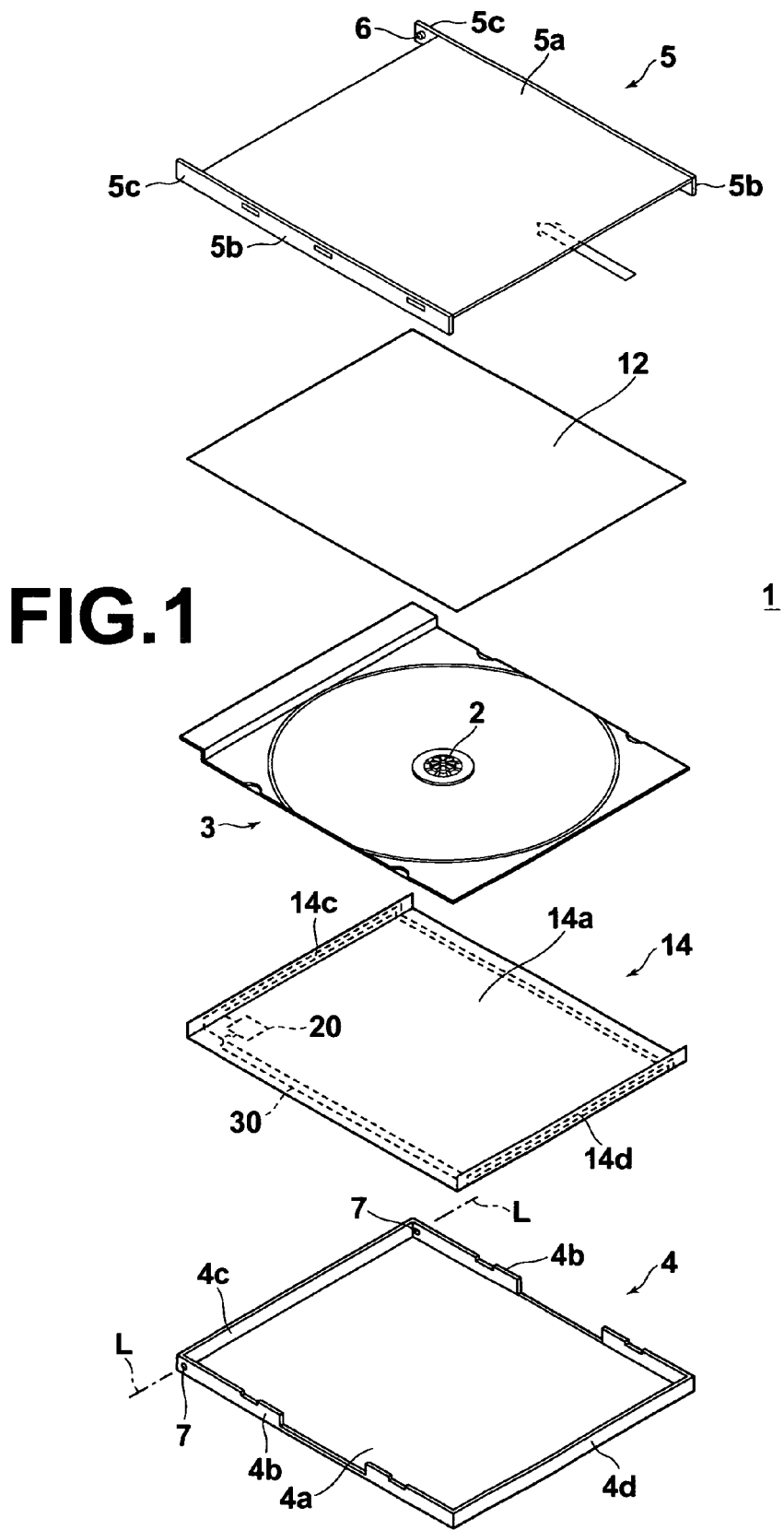
FIG. 1 is an exploded perspective view showing a disk casing provided with an index card in accordance with a first embodiment of the present invention.
Figure 2:
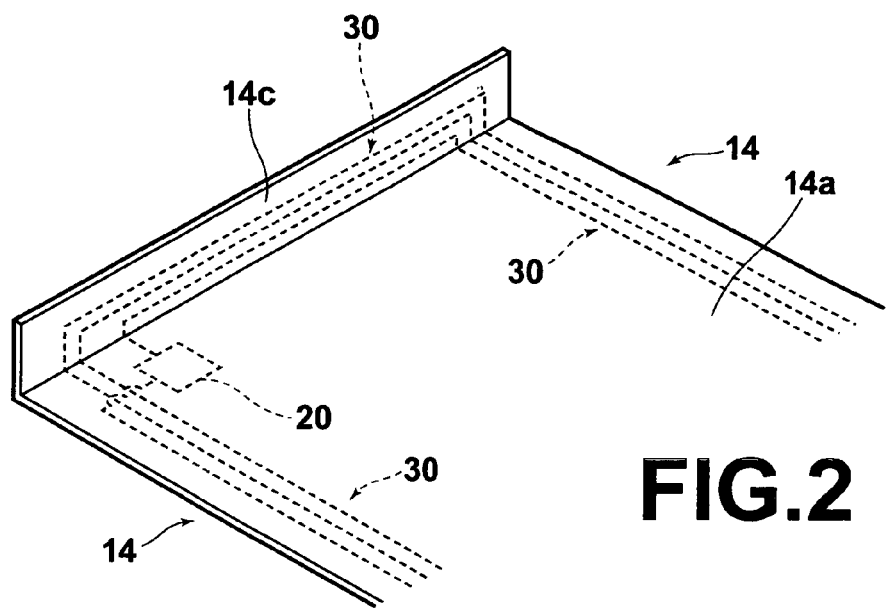
FIG. 2 is an enlarged perspective view showing an important part of the lower index card shown in FIG. 1.

FIG. 1 is an exploded perspective view showing a disk casing provided with an index card in accordance with a first embodiment of the present invention, and FIG. 2 is an enlarged perspective view showing an important part of the lower index card thereof.

The disk casing 1 is for accommodating an optical disk such as a CD or a DVD as a recording medium and comprises a plastic disk tray 3 provided at the center of the upper surface thereof with a disk damper 2 which is engaged with a central opening of the disk (not shown) to removably support the disk, a plastic lower lid 4 which has a flat main plate portion 4a to removably accommodate and fix the disk tray 3, and a plastic upper lid 5 which has a flat main plate portion 5a and is pivoted on the lower lid 4 to be opened and closed about an axis L.

The upper lid 5 has a pair of hinge arms 5c extending from one ends of a pair of side walls 5b, and short shafts 6a extend inward from the respective hinge arms 5c. By engagement of the short shafts 6a in pivot holes 7 formed in side walls 4b of the lower lid 4 along the axis L, the upper lid 5 is pivoted on the lower lid 4 to be opened and closed about an axis L.

An upper index card 12 is held on the back side of the upper lid 5 by a plurality of retainer pieces (not shown) and a lower index card 14 is interposed between a bottom surface 3a of the disk tray 3 and an inner bottom surface 4c. The lower index card 14 comprises a main label portion 14a and a pair of back label portions 14c and 14d bent upward by about 90° from opposite ends of the main label portion 14a. The back label portions 14c and 14d are mounted on the inner surface of end walls 4c and 4d of the lower lid 4.

Accordingly, what is recorded on the upper index card 12 can be viewed through the transparent main plate portion 5a of the upper lid 5 and what is recorded on the lower index card 14 can be viewed through the main plate portion 4a and the transparent end walls 4c and 4d of the lower lid 4.

As shown in FIG. 2, a non-contact type IC 20 is embedded at a corner of the main label portion 14a of the lower index card 14 and a loop antenna 30 connected to the non-contact type IC 20 is positioned from the outer periphery of the main label portion 14a to the back label portions 14c and 14d.

Since the loop antenna 30 is positioned along the outer periphery of the main label portion 14a, the transmission range can be widened and at the same time, since the loop antenna 30 is positioned in the back label portions 14c and 14d bent upward by about 90° to the main label portion 14a, transmittable regions from different directions can be set.

Figure 3:
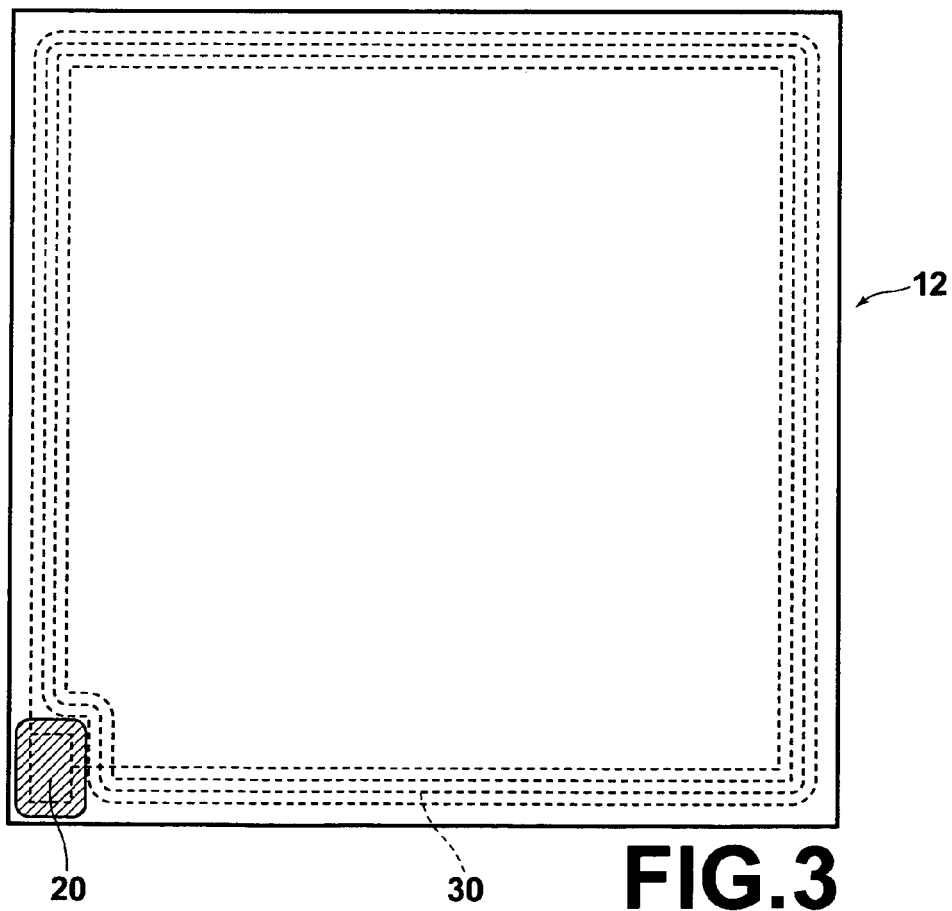
FIG. 3 is an enlarged plan view showing an index card in accordance with a second embodiment of the present invention.

FIG. 3 is a view showing an index card in accordance with a second embodiment of the present invention. For example, a plastic-sealed non-contact type IC 20 is positioned at a corner of the upper index card 12 and a loop antenna 30 connected to the non-contact type IC 20 is positioned along the outer periphery of the upper index card 12. By positioning the loop antenna 30 along the outer periphery of the upper index card 12 which is relatively large in area, the transmission range can be widened.

Figure 4:
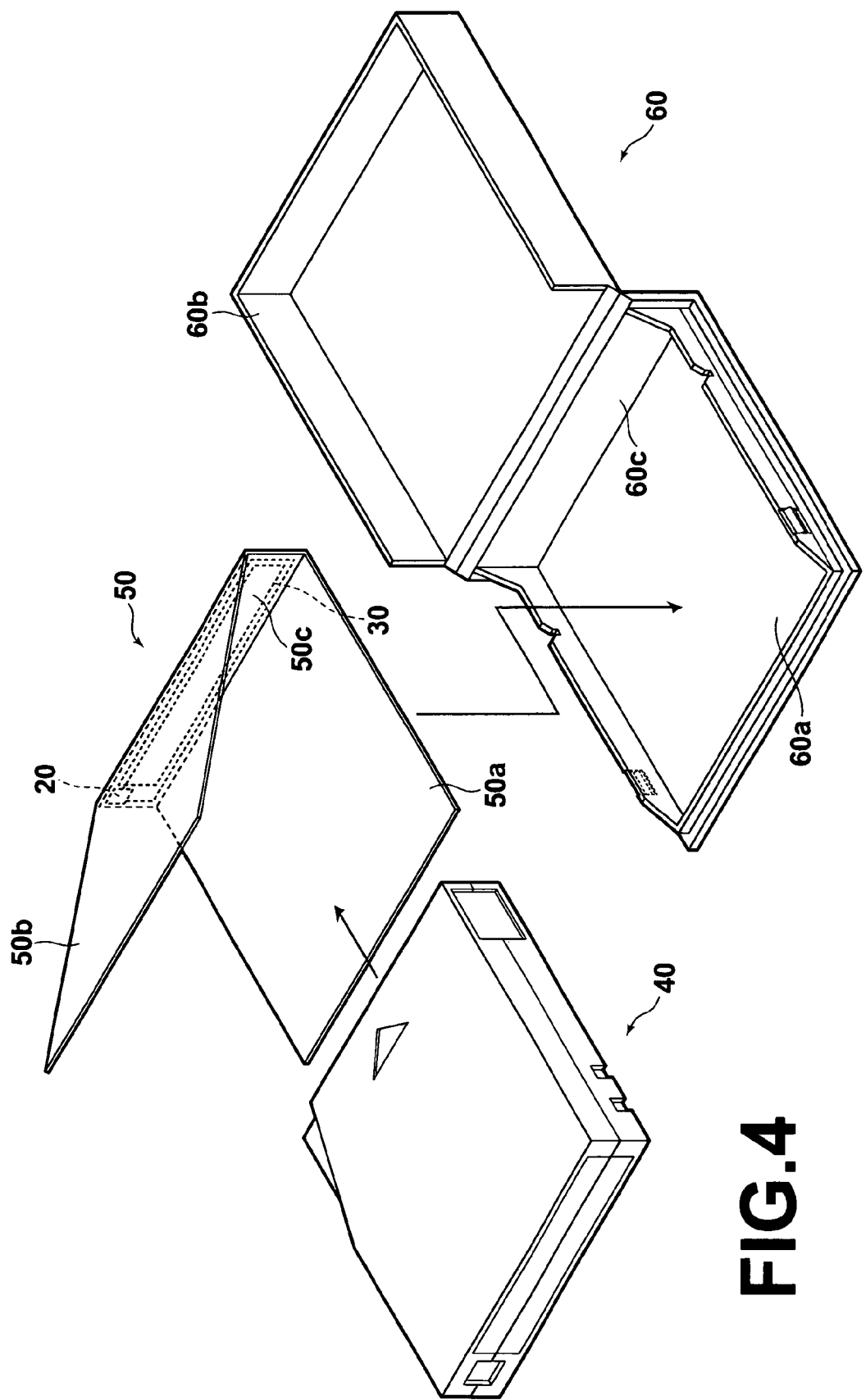
FIG. 4 is a perspective view showing an index card in accordance with a third embodiment of the present invention together with the tape cartridge and the casing for the cartridge.

FIG. 4 is a view showing an index card in accordance with a third embodiment of the present invention. The recording medium is a one-reel type tape cartridge 40 in this embodiment.

The index card 50 for the tape cartridge 40 comprises a lower level portion 50a attached to a bottom surface of the tape cartridge 40, an upper level portion 50b attached to a top surface of the tape cartridge 40 and a back label portion 50c joining the lower and upper level portions 50a and 50b, which are integrated with each other, and is substantially U-shaped. An IC 20 and a loop antenna 30 connected to the IC 20 are positioned in the back label portion 50c.

The casing 60 for accommodating the tape cartridge 40 comprises a casing body 60a, and a lid body 60b which is integrally provided on the upper edge of one side wall 60c of the casing body 60a by way of hinge portion, and the tape cartridge 40 is accommodated in the casing 60 together with the index card 50. In the accommodated state, the lower level portion 50a of the index card 50 is interposed between the bottom surface of the tape cartridge 40 and the bottom wall of the casing body 60a, the back label portion 50c of the index card 50 is interposed between the side surface of the tape cartridge 40 and the side wall of the casing body 60a, and the upper level portion 50b of the index card 50 is interposed between the top surface of the tape cartridge 40 and a top plate of the lid body 60b.

When the loop antenna 30 connected to the non-contact type IC 20 is positioned in only the back label portion 50c, interferences of transmissions can be prevented when a number of cartridge casings 60 each accommodating therein the tape cartridge 40 together with the index card 50 are arranged in the same direction or are stacked in the same direction.

Figure 5:
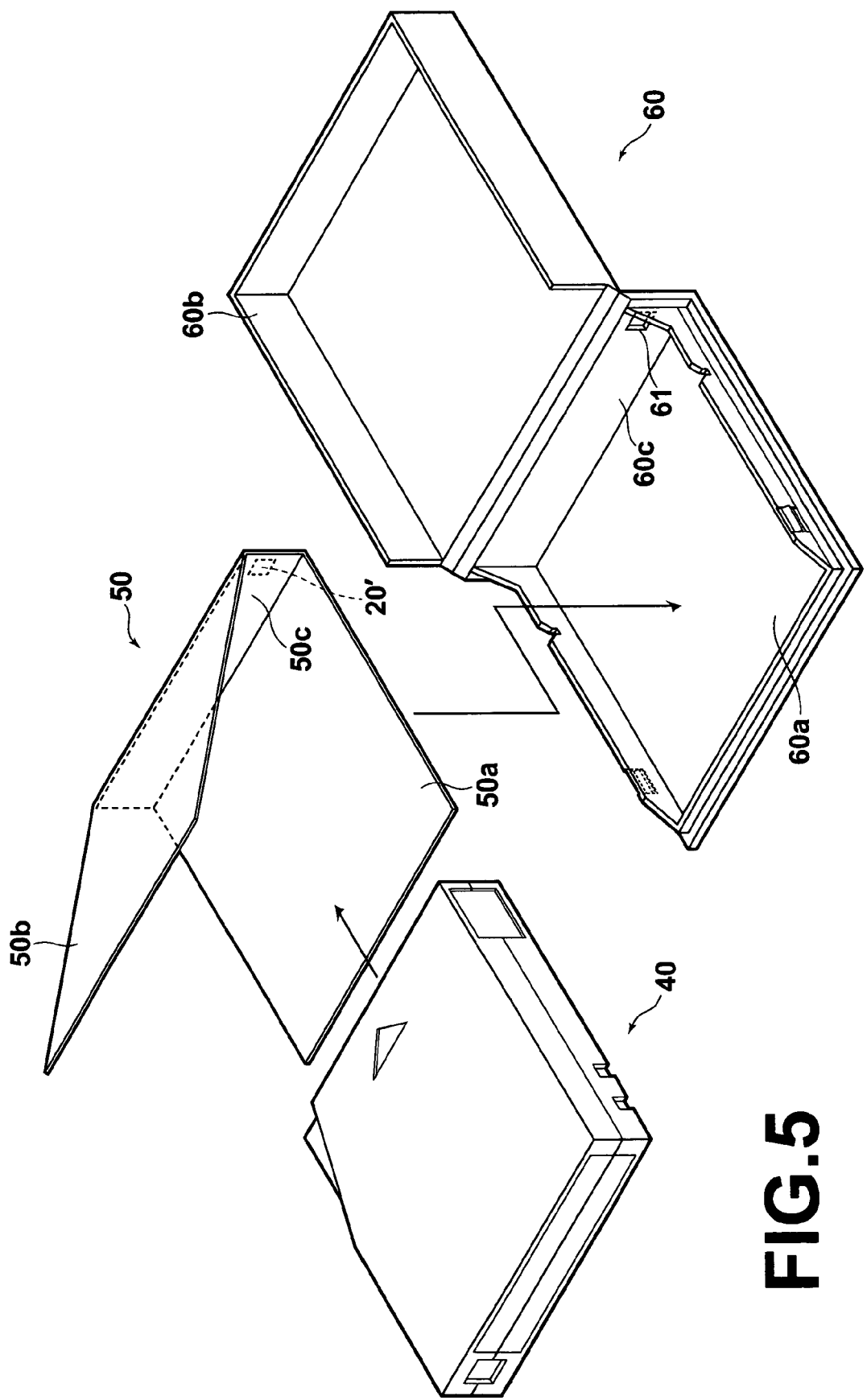
FIG. 5 is a perspective view showing an index card in accordance with a fourth embodiment of the present invention together with the tape cartridge and the casing for the cartridge.

FIG. 5 is a view showing an index card in accordance with a fourth embodiment of the present invention. The recording medium is a one-reel type tape cartridge 40 in this embodiment as in the embodiment shown in FIG. 4.

The index card 50 of this embodiment is the same as the index card 50 shown in FIG. 4 except that a contact type IC 20' is positioned at a corner of the back label portion 50c and no loop antenna 30 is provided. The contact type IC 20' positioned at a corner of the back label portion 50c has a terminal (not shown) exposed to the outside of the back label portion 50c.

The cartridge casing 60 shown in FIG. 5 is the same as the cartridge casing 60 shown in FIG. 4 except that an opening 61 which faces outward the terminal of the IC 20' is formed in the side wall 60c of the casing body 60a in a position corresponding to the IC 20'.

Accordingly, by gaining access to the terminal from outside through the opening 61, write and read of information on and from the IC 20' is enabled in a closed state of the casing 60.

What is claimed is:

1. An index card comprising:
   at least one label portion;
   at least one of a contact type or non-contact type integrated circuit (IC) disposed on the at least one label portion, said integrated circuit storing information or processing signals; and
   an antenna disposed on the at least one label portion, said antenna connected to the at least one of a contact type or non-contact type IC,
   wherein the antenna extends substantially around an entire periphery of the at least one label portion, and
   wherein the at least one label portion comprises a main label portion and a back label portion connected to an edge of the main label portion and extending from the edge in a direction substantially perpendicular to the main label portion, and wherein the antenna is positioned in both the main label portion and the back label portion, and
   wherein if a media is enclosed within the one label portion as part of a media housing when the media housing is in a closed position, the main label portion is on one side of the media and the back label portion is on another side of the media.

2. An index card comprising:
   at least one label portion;
   at least one of a contact type or non-contact type integrated circuit (IC) disposed on the at least one label portion, said integrated circuit storing information or processing signals; and
   an antenna disposed on the at least one label portion, said antenna connected to the at least one of a contact type or non-contact type IC,
   wherein the antenna extends substantially around an entire periphery of the at least one label portion, and
   wherein the at least one label portion comprises a main label portion and a back label portion connected to an edge of the main label portion and extending from the edge in a direction substantially perpendicular to the main label portion, and wherein the antenna is positioned only in the back label portion, and
   wherein if a media is enclosed within the one label portion as part of a media housing when the media housing is in a closed position, the main label portion is on one side of the media and the back label portion is on another side of the media.

3. The index card as defined in claim 1, wherein at least one of the contact type and the non-contact type IC and the antenna is coated with a coating layer.

4. The index card as defined in claim 3, wherein the coating layer is of a writable material.

5. The index card as defined in claim 1, wherein at least one of the contact type and the non-contact type IC and the antenna is positioned as to not be visible as viewed from outside a casing if the index card is placed in the casing and the casing is closed.

6. An index card as defined in claim 1, wherein the at least one of a contact type or non-contact type IC is positioned on the outer periphery of the index card.

7. The index card as defined in claim 6, wherein the IC is positioned in a corner of the index card.

8. The index card as defined in claim 1, wherein a writable region is a region other than a region of the at least one of a contact type or non-contact type IC.

9. A casing for a recording medium provided with an index card defined in claim 1.

* * * * *